Oct. 20, 1970 J. OSWALD 3,535,452

DEMODULATION METHOD AND DEVICES FOR RHYTHMICALLY MODULATED WAVES USING FOUR-PHASE DIFFERENTIAL MODULATION

Filed Feb. 16, 1967 8 Sheets-Sheet 1

Inventor-
Jacques Oswald
By:
Edwin E. Greigg
ATTORNEY 16, 1F: "AND" CIRCUITS

31: "AND" CIRCUIT
32: HALF-ADDER

111 TO 115
135 TO 139 } BISTABLE CIRCUITS

211 TO 214: HALF-ADDERS
215: REVERSING SWITCH

United States Patent Office 3,535,452

Patented Oct. 20, 1970

3,535,452

DEMODULATION METHOD AND DEVICES FOR RHYTHMICALLY MODULATED WAVES USING FOUR-PHASE DIFFERENTIAL MODULATION

Jacques Oswald, Versailles, France, assignor to C.I.T.-Compagnie Industrielle des Telecommunication, Paris, France Filed Feb. 16, 1967, Ser. No. 616,509
Claims priority, application France, Mar. 2, 1966, 51,754
Int. Cl. H04b 1/16; H04i 15/24
U.S. Cl. 178—88 7 Claims

ABSTRACT OF THE DISCLOSURE

A device for demodulating carrier waves of frequency $f_0$ modulated by rhythmic coded signal pairs of duration substantially equal to an integer multiple of $1/2f_0$ according to phase jumps substantially equal to odd multiples of 45 degrees, in which said waves are periodically sampled for their polarity at a frequency equal to an integer multiple of $8f_0$. Binary signals of value 0 or 1 are caused to correspond to the polarity of each sample, and the values of four such signals and their complementary quantities taken at four different times separated by predetermined intervals are stored in a register from which they are fed to a logic circuit in which they are combined by Boolean "modulo 2" adders ("exclusive OR" circuits), to obtain four further binary signals, which in turn are combined by "OR" and "AND" circuits into four other binary signals; each of the latter is multiplied at any instant by its corresponding value at another instant preceding said instant by $1/8f_0$, into a logical product. Additive two-by-two logical addition of said products yields the values of the elements of the coded signal pairs. Logic circuits for performing above-said operations are described.

BACKGROUND OF THE INVENTION

The present invention relates to methods and devices adapted to the demodulation of waves modulated by coded signal pairs according to the four-phase process, in the case where said process makes use of phase jumps equal to odd multiples of 45 degrees.

Field of the invention

More specifically, the present invention relates to improvements in the processes and devices for the reception of rhythmic binary telegraphic signals or the like, such as coded data transmission signals, in the case where these signals are transmitted by successive pairs each occupying a constant time interval T, and in the case where the corresponding telegraphic modulation applied to a carrier wave of constant period $T_0$ is of the type called "quadrivalent phase differential modulation," that is to say in which each of the four possible different combinations in a pair of binary signals is represented by a phase jump of this carrier wave, the magnitude of this jump being different according to the momentarily transmitted combination.

More precisely, the present invention concerns demodulation processes and devices applicable to the case of quadrivalent phase differential modulation when to the four different combinations of binary signals transmitted by pairs and sometimes called "doublets" or "dibits," there correspond respectively phase jumps substantially equal to 45, 135, 225, and 315 degrees, that is to say equal to the successive odd multiples of 45 degrees which are less than 360 degrees.

It is already known to employ, for transmissions of the kind considered above, phase jumps of the above-mentioned values, and transmitting means of the corresponding phase-modulated waves, and demodulation of the latter have been described in various prior patents and publications, as well as the general advantages presented by the choice which has just been mentioned for the values of the phase jumps of the carrier wave.

Some known methods and devices for demodulating differential phase modulated waves make use of phase comparators operated from the received wave and a delayed wave derived therefrom.

Another known demodulation technique makes use of periodical sampling of the polarity of the received wave and subsequent logical treatment of the samples taken, after conversion of the said samples into binary quantities which can assume only one of the two values 0 and 1.

The invention more particularly relates to means for applying to waves having quadrivalent phase differential modulation, employing phase jumps of 45, 135, 225 or 315 degrees, the latter mentioned demodulation technique, according to a modification of that applied, in a known manner, to the case of waves modulated by phase jumps of 0, 90, 180 or 270 degrees.

Description of the prior art

Demodulation methods and devices applicable to quadrivalent differential phase modulated waves, for the case where the four possible phase jumps values are 0, 90, 180 and 270 degrees, have already been described in various patents, more particularly in the French Pats. 1,383,789 and 1,404,512 and in the additional Pat. 84,857 to the French Pat. 1,383,789.

SUMMARY OF THE INVENTION

In the following description, and according to a frequently adopted convention, the two elements of each pair of binary signals to be transmitted will be considered as appearing successively each during a time interval $T/2$, the two possible values of each of them being denoted by A and Z (it is generally agreed that A represents the number 0 and Z the number 1). Thus, the four possible pairs are AA, ZZ, AZ and ZA. It should be well understood, however, that the pairs in question may also represent two binary signals appearing simultaneously during the time interval T, for example on two different communication channels.

According to the present invention, there is provided a demodulation process for a carrier wave rhythmically modulated by binary coded signals grouped in successive pairs of constant duration T, whereof each of the two elements $A_1$ and $A_2$ may have either of two values A and Z, the modulation of the said wave consisting for each of the said pairs in a phase jump having substantially one of the four values 45, 135, 225 and 315 degrees, each of which represents a different one of the four possible combinations by permutation of the values A and Z in each of the said pairs, the said carrier wave having furthermore a frequency $f_0=1/T_0$ substantially such that the duration T contains an integer number N of half-cycles $T_0/2$ at the said frequency; the said process consisting in sampling the said carrier wave periodically, at instants separated by time intervals equal to $T_0/8N_1$, $N_1$ being an integer number at least equal to unity; in transforming each sample taken at an instant $t$ into a binary quantity having one of the values 0 and 1 according to whether the said sample has one or the other of the two possible polarities at the said instant $t$; in storing the binary quantities thus obtained for a time at least equal to $(T+T_0/4)$; and in effecting, on four of the binary quantities thus stored, respectively denoted hereinafter by $x_2$, $y_2$, $x_1$, $y_1$ and corresponding respectively to the samples successively taken at instants $t_1$, $(t-T_0/4)$, $(t-T)$, $(t-T-T_0/4)$ and on the complementary quantities (in the sense of Boolean algebra $\bar{x}_2$, $\bar{y}_2$, $\bar{x}_1$, $\bar{y}_1$ of the said quantities $x_2$, $y_2$, $x_1$, $y_1$, of a sequence of logical operations with a view to obtaining the corresponding values $A_1$ and $A_2$ of each of the two elements forming each of the said pairs of binary coded signals; the said process being characterized in that the said sequence of operations comprises:

Effecting on the said quantities $x_2$, $y_2$, $x_1$, $y_1$, $\bar{x}_2$, $\bar{y}_2$, $\bar{x}_1$, $\bar{y}_1$ four "modulo 2" logical additions each affecting two of the said quantities and so obtaining four fresh binary quantities hereinafter denoted by $m$, $n$, $p$, $q$;

Obtaining on one hand by ordinary logical addition and on the other hand by multiplication of pairs of these latter quantities, four other binary quantities $S_1$, $S_2$, $P_1$, $P_2$ respectively equal to $(m+n)$, $(p+q)$, $mn$ and $pq$;

Multiplying the value of each of the logical quantities $S_1$, $S_2$, $P_1$ and $P_2$ taken at the said instant $t$ by its value at an instant preceding the latter said instant by $T_0/8$ and obtaining therefrom four fresh corresponding quantities $S'_1$, $S'_2$, $P'_1$, $P'_2$; and Obtaining by the logical additions $(S'_1+P'_1)$ and $(S'_2+P'_2)$ the logical values $A_1$ and $A_2$ of each of the two elements forming each of the pairs of the above-mentioned binary signals.

According to a preferred embodiment of the process of the invention, the quantities represented by the logical values $x_1$, $y_1$, $x_2$, $y_2$, before applying to them the "modulo 2" logical addition procedure supplying the quantities $m$, $n$, $p$, $q$, are subjected to a supplementary operation called "majority decision" operation, which comprises comparing each of the said values, taken at a given sampling instant, with the values obtained for the same quantity at a number of consecutive sampling instants immediately preceding the said given instant, and taking as true value of the said quantity that which forms the majority of the values thus compared.

According to another embodiment modification of the process of the invention, particularly applicable to the case where the two binary elements $A_1$ and $A_2$ of the pair of signals to be demodulated have, after demodulation, to be restored in succession in time, there is also provided a treatment producing from the aforesaid quantities $S'_1$ and $P'_2$ synchronizing signals adapted to control a clock (local timing pulses generator) regulating the operation of the time-dependent procedures subsequently applied to $A_1$ and $A_2$.

In the case where the number N is an odd number, the quantities $m$, $n$, $p$, $q$ are respectively given by the formulae:

$$m=x_1\oplus x_2;\ n=y_1\oplus y_2;\ p=x_2\oplus y_1;\ q=\bar{x}_1\oplus y_2$$

In the case where the number N is an even number, the quantities $m$, $n$, $p$, $q$ are respectively given by the formulae:

$$m=\bar{x}_1\oplus x_2;\ n=\bar{y}_1\oplus y_2;\ p=x_2\oplus\bar{y}_1;\ q=x_1\oplus y_2$$

where in all cases the sign $\oplus$ denotes the "modulo 2" Boolean addition.

The invention also concerns, of course, devices adapted to the carrying out of the processes hereinbefore specified.

In a general manner, a demodulator device according to the invention comprises a sampling circuit receiving at its input the carrier wave to be demodulated, and the output of which feeds the input of a storage means adapted to store in the form of binary signals the respective polarities of the samples taken during a time at least equal to $(T+T_0/4)$, connection means connected to four accesses of the said storage means and transmitting four binary signals corresponding respectively to samples taken at times $t$, $(t-T_0/4)$, $(t-T)$ and $(t-T-T_0/4)$ to a logical circuit, and means in this logical circuit for performing on the said four binary signals the operations specified above in connection with the process of the invention, so as to obtain, at two respective outputs of the said logical circuit, two binary signals $A_1$ and $A_2$ constituting the two elements of each of the demodulated pairs of binary signals.

The main object of the invention is to provide a better and simpler logical circuit than those already known in the art, and particularly than those described in the above-cited French patents.

According to the invention, there is provided a demodulator device for a carrier wave rhythmically modulated by binary coded signals grouped in successive pairs of constant duration T, whereof each of the two elements $A_1$ and $A_2$ may have either of two values A and Z, the modulation of the said carrier wave consisting for each of the said pairs in a phase jump of the said carrier wave having substantially one of the values 45, 135, 225 and 315 degrees, each of which corresponds to a different one of the four combinations by permutation of the values A and Z of the said two elements, the said carrier wave having a frequency $f_0=1/T_0$ substantially such that the duration T contains an integer number N of half-cycles $T_0/2$ at the said frequency; the said device comprising a sampling circuit having one input and one output and controlled by a source of time pulses (clock) delivering control pulses with the repetition period $T_0/8N_1$, $N_1$ being an integer number at least equal to unity, means for applying the said carrier wave to the said input, means for applying the sampled signals, obtained at the output of the said sampling circuit and each having either of two possible binary values according to the polarity of the said sampled wave, to the input of a storage means comprising a shift register having at least $(4N+2)N_1$ bistable stages, the input stage of which assumes either of its two possible states according to the binary condition of each of the said sampled signals, and of which each stage assumes either of the said possible two states under the control of the preceding stage; and connection means connecting respectively four of the said stages, three of which have their ranks, counting from the first of the said four stages, respectively equal to that of the said first stage increased by $2N_1$, $4NN_1$ and $(4N+2)N_1$, to four corresponding inputs of a logical circuit, and transmitting to these latter inputs binary signals, whereof the respective values $x_2$, $y_2$, $x_1$, $y_1$ are equal to 0 or 1 according to the instantaneous state of each of the stages connected to the said four inputs; the said logical circuit delivering respectively to first and a second output terminal binary signals forming the elements $A_1$ and $A_2$ of the pairs of demodulated signals; the said device being characterized in that the said logical circuit comprises:

Four "half-adder" circuits ("exclusive OR" circuits) each having two inputs and one output, the said two inputs being connected respectievly to two of the said four inputs of the said logical circuit, the said inputs being selected differently for each of the said four circuits; and the outputs of these latter circuits delivering respectively the logical "modulo 2" sums $(m, n, p, q)$ of the signals applied to their inputs;

Two logical addition circuits ("OR" circuits) each having two inputs and one output, these latter inputs being connected respectively to two different output pairs of the said four half-adder circuits for either of the said two addition circuits, such that the said two circuits respectively deliver to their outputs the logical sums $(m+n)$ and $(p+q)$;

Two logical multiplication circuits ("AND" circuits) each having two inputs and one output, these latter inputs being connected respectively to two different pairs of outputs of the said four half-adder circuits for either of the said multiplication circuits, such that the outputs of the latter circuits deliver respectively the logical products $(mm)$ and $(pq)$;

Four selection means for forming at each instant the logical products $S'_1$, $S'_2$, $P'_1$, $P'_2$ of the value of each of the quantities $(m+n)$, $(p+q)$, $mn$ and $pq$, by its value at an instant preceding this latter instant by $T_0/8$, each of the said selection means having two inputs connected respetcively to the output of the corresponding one of the said logical addition circuits and to the output of the crresponding one of the said logical multiplication circuits, and having an output delivering one of the aforesaid quantities $S'_1$, $S'_2$, $P'_1$ and $P'_2$;

Two further logical addition circuits each having two inputs and one output, these two inputs being connected respectively for one of the latter addition circuits to the outputs of two of the said selection means supplying respectively the said quantities $S'_1$ and $P'_1$, and for the other of the said latter addition circuits to the outputs of the other two said selection means supplying respectively the said quantities $S'_2$ and $P'_2$, each of the said further two addition circuits having an output delivering for one of them the quantity $(S'_1+P'_1)$, and for the other the quantity $(S'_2+P'_2)$; and Other connection means connecting respectively the outputs of both the said further logical addition circuits to the said first and second output terminals delivering respectively the said binary signals $A_1$ and $A_2$ forming the two elements of the said demodulated pairs of binary signals.

According to a preferred embodiment of the device of the invention, the said first-mentioned connection means comprise in each connection transferring the binary variables $x_1$, $y_1$, $x_2$, $y_2$, from the storage means (shift register) to the logical circuit, an apparatus called "majority decision register," the function of which is to correct the errors and accidental disturbances which may arise in the generation of the binary signals $x_2$, $y_2$, $x_1$, $x_1$. Such an apparatus has been described in U.S. patent application No. 454,048, now Pat. No. 3,479,457. It will merely be recalled here that this apparatus substantially comprises a shift register receiving at its input the binary signals as they are produced by the successive sampling operations, as well as logical members comparing at each instant the value of an odd number of binary signals supplied by a corresponding number of consecutive stages of the same shift register, the said logical members supplying to the output of the apparatus a binary signal, the value of which is that of the majority of the signals thus compared. The progression of the signals inside the register is preferably regulated by the clock controlling the sampling circuit.

Also according to a preferred embodiment of the device of the invention, the said other connection means connecting the said other logical addition circuits to the output terminals delivering the signals $A_1$ and $A_2$ likewise comprise majority decision registers.

Finally, in an important modification of the embodiment of the invention, two of the four previously mentioned section means serve to supply from the signals $P'_1$ and $S'_2$ and by means of a supplementary logical addition circuit, synchronization pulses appearing at a third output terminal and adapted to synchronize an auxiliary clock transmitting timing signals at a repetition frequency having an exact numerical relation with the quantity $1/T$, with constant phase relation relative to the times of commencement and end of the time intervals T corresponding to the transmission of successive pairs of binary signals.

The invention will be better understood from the following detailed description of one of its embodiment examples, given with the aid of the accompanying drawings.

DESCRIPTION OF THE PREFERRED EMBODIMENTS

A description of some special cases of the employment of the above-mentioned processes and devices will now be given, but it should be well understood that the character of this description is by no means restrictive. The numerical values adopted for the whole numbers N and $N_1$ have been selected solely by way of example and could be different. Furthermore, the logical circuit, which is an essential element of the invention and has to perform the functions explained in the foregoing, may be constructed according to the known technique of circuits of this kind or quite different ways with the same results. The constructional form described in what follows for this circuit, although it has been found particularly advantageous in practice, should also be considered as a non-restrictive example of the practical application of the invention.

To facilitate the description, the two possible binary values of each of the two elements of a pair of telegraphic signals or the like will be denoted hereafter, as already mentioned, by A and Z, with the convention $A=0$ and $Z=1$; and it will furthermore be assumed, by way of non-restrictive example, that the duration T of a pair of elementary signals is equal to three times the half-cycle $T_0/2$ of the carrier wave (that is to say, that $N=3$), that the number $N_1$ is equal to 2, that is to say that twenty-four samplings of the carrier wave are made during each time interval of duration T, and that the phase pumps $\delta\varphi$ of values 45, 135, 225 or 315 degrees are phase lags, which is furthermore simply a question of convention, since it is obvious that a phase lag of 315 degrees, for example, is indistinguishable from a phase lead of 45 degrees.

Figure 1:
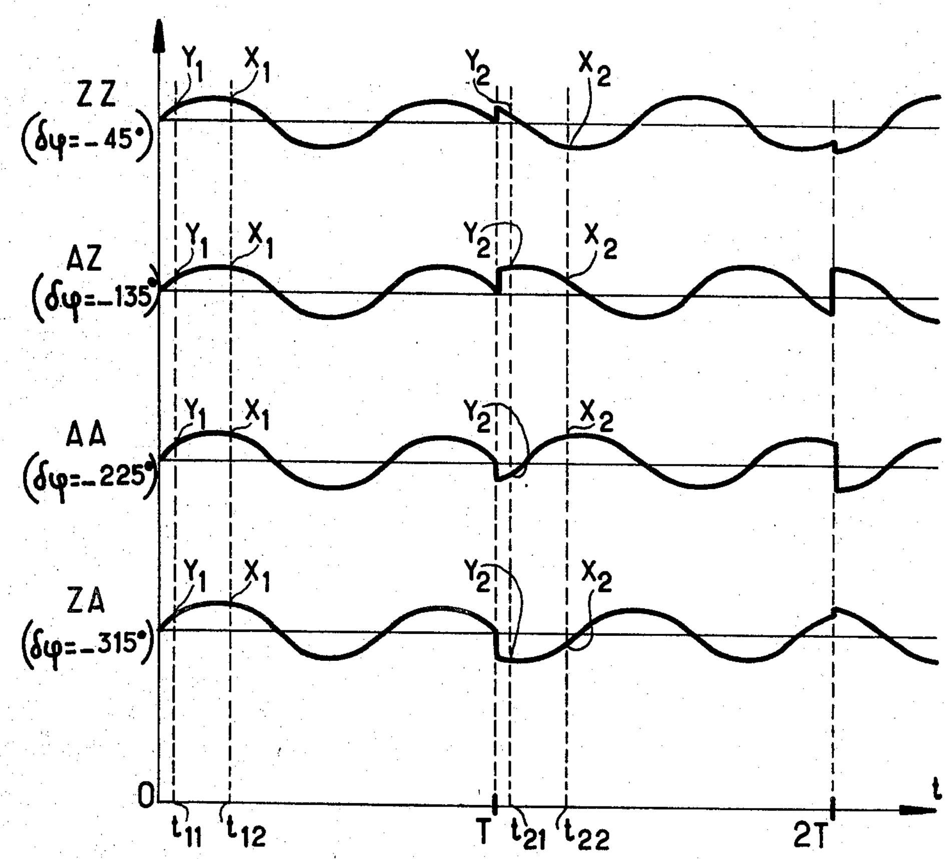
FIG. 1 is a graphical representation as a function of time of a carrier wave modulated by phase jumps by pairs of successive identical binary signals each having four possible forms ZZ, AZ, AA and ZA.

Referring first of all to FIG. 1, there will be seen in the latter four curves representing the theoretical wave form of a signal modulated by phase jumps in a "monotonic" sequence, that is to say, formed of successive pairs of identical binary signals, of respective compositions ZZ, AZ, AA and ZA, taking the four curves successively from top to bottom of the figure. It has been assumed that the corresponding phase jumps are respectively (−45), (−135), (−225) and (−315 degrees). Four vertical dashed lines correspond respectively to the four times $t$, $(t-t_0/4)$, $(t-T)$ and $(t-T-T_0/4)$ on the horizontal axis of the times $t$. To simplify the language, the four times in question will be denoted respectively hereafter, as in FIG. 1, by $t_{22}$, $t_{21}$, $t_{12}$ and $t_{11}$. The above-mentioned phase jumps are assumed to occur at the instants 0, T, 2T, etc.

By means of FIG. 1 it will first of all be shown, by a simple example, that it is possible to obtain, from the polarities of the transmitted wave, recognized by samplings successively effected at the four instants in question, the binary values of the elements of the pairs of corresponding signals.

Referring first of all to the curve situated in the top part of FIG. 1 (curve ZZ), the ordinate of this curve relative to its time axis may be represented by:

$$f(t)=A_0 \cos (2\pi f_0 t+\varphi_0+\varphi) \quad (1)$$

$A_0$ being the maximum amplitude of the wave (assumed to be sinusoidal), $\varphi_0$ being an initial phase constant and $\varphi$ being a phase constant dependent, in each interval (0, T) (T, 2T) etc., on the phase jumps to which the wave shown has already been subject. It is assumed as before that T contains three half-cycles $1/f_0$ of the carrier wave.

Denoting now by $F(t)$ a function of $f(t)$ which by convention is equal to 0 if $f(t)$ is positive, and to 1 if $f(t)$ is negative, and by $x_2$, $y_2$, $x_1$, $y_1$ the respective values of $F(t)$ at the instants $t_{22}$, $t_{21}$, $t_{12}$, $t_{11}$, we find in the case where these four instants are selected as shown in FIG. 1:

$$x_2=1;\ y_2=0;\ x_1=0;\ y_1=0$$

Denoting by the sign $\oplus$ the "modulo 2" Boolean addition, we find:

$$m=x_1\oplus x_2=1$$
$$n=y_1\oplus y_2=0$$
$$p=x_2\oplus y_1=1$$
$$q=x_1\oplus y_2=1$$

Then by forming by ordinary logical addition and multiplication (that is to say according to the rules of classic algebra, except for the convention $1+1=1$) the quantities:

$$S_1=m+n \quad S_2=p+q \quad P_1=mn \quad P_2=pq$$

we find:

$$S_1=1 \quad S_2=1$$
$$P_1=0 \quad P_2=1$$

Then forming $(S_1+P_1)$ and $(S_2+P_2)$, we find:

$$A_1=S_1+P_1=1 \quad A_2=S_2+P_2=1$$

which shows that by arranging to make the first and the second element of each of the transmitted binary pairs of signals correspond to the quantities $A_1$ and $A_2$, the couple $(A_1A_2)$ has definitely the form ZZ.

It is still necessary, however, to verify that the above result obtained for $A_1$ and $A_2$ is in the largest measure independent of the choice of the time $t_{22}$ within the time interval (T, 2T) (FIG. 1).

For this purpose, it suffices to observe that, by using Formula 1, the four quantities $f(t_{11})$, $f(_{12})$, $f(t_{21})$, $f(t_{22})$ in the case of the curve (ZZ) of FIG. 1 and assuming that $t_{22}$ takes any value $t$, have the values:

$$Y_1=f(t_{11})=-A_0 \sin (2\pi f_0t+\varphi_0)$$
$$X_1=f(t_{12})=-A_0 \cos (2\pi f_0t+\varphi_0)$$
$$Y_2=f(t_{21})=A_0 \sin (2\pi f_0t+\varphi_0-\pi/4)$$
$$X_2=f(t_{22})=A_0 \cos (2\pi f_0t+\varphi_0-\pi/4)$$

(taking into account by the term $-\pi/4$ the phase jump of 45 degrees which occurs at the time $t=T$).

Formulae 2 show that irrespective of the quadrant in which the angle $(2\pi f_0t+\varphi_0)$ is situated, the same values are obtained for $(m+n)$ and $(p+q)$.

In fact, according to the known properties of trigonometric functions, the expressions $X_1X_2$ and $Y_1Y_2$ cannot both be positive simultaneously, since:

$$\frac{X_1X_2+Y_1Y_2}{A_0^2}=-\cos\frac{\pi}{4}=-\frac{\sqrt{2}}{2}$$

Since one of them is necessarily negative, it follows that:

$$(x_1\oplus x_2)+(y_1\oplus y_2)=m+n=1 \qquad (3)$$

A similar reasoning carried out on $X_1Y_2$ and $X_2Y_1$ also shows that these quantities cannot both be negative, whence:

$$(p+q)=1 \qquad (4)$$

Conditions 3 and 4 are sufficient to be sure that irrespective of the values of $(mn)$ and $(pq)$, we always have $A_1=A_2=1$.

It is also possible to verify that the results obtained for the curve ZZ of FIG. 1 are not tied to the fact that, in this FIG. 1, the instances corresponding to $(x_1y_1)$, on the one hand, and to $(x_2y_2)$, on the other, form two groups situated on either side of a phase jump time. The same results would still be valid if the phase jumps were inserted, on the one hand, between the instants corresponding to $x_1$ and $y_1$, on the other hand, between the instants corresponding to $x_2$ and $y_2$, the values of $(m+n)$, $(p+q)$ and consequently $(S_1+P_1)$ and $(S_2+P_2)$ remaining unaltered.

Properties so simple, however, do not exist in the case of the curves AZ, AA and ZA of FIG. 1. In the case of curve (AZ) of FIG. 1, it is possible to show that we always have $$mn=0 \qquad (5)$$

and that $(p+q)$ is generally equal to 1, except for exceptional points. On the contrary, nothing can be said of the quantities $pq$ and $(m+n)$, which are independent of the choice of sampling instants.

In the case of the curve (AA), it is similarly possible to show that $$mn=pq=0 \qquad (6)$$

but there is no property of invariance for the values of $(m+n)$ and $(p+q)$.

Finally in the case of the curve (ZA) we find:

$$m+n=1 \quad pq=0 \qquad (7)$$

but there is no property of invariance for $mn$ and $(p+q)$.

It will be seen later how by means of a supplementary operation called "numerical filtering" operation, applied to all the cases, it is possible to suppress any ambiguity in the demodulation of signal represented by the curves AZ, AA and ZA of FIG. 1.

The properties explained by means of FIG. 1 are, of course, modified somewhat when, as is the general case, we are not dealing with a monotonic sequence of pairs of signals, that is to say when not all of the pairs have the same composition. However, the errors which could result are eliminated in practice due to the fact that during a duration T we do not carry out a single pair of samplings such as those effected at the instants $t_{11}$ and $t_{12}$ or $t_{21}$ and $t_{22}$ (FIG. 1), but multiple and frequent samplings, the comparison of the results of which make it possible to determine, by majority decision, the true values of the transmitted signals, as will be explained more fully later.

Figure 2:
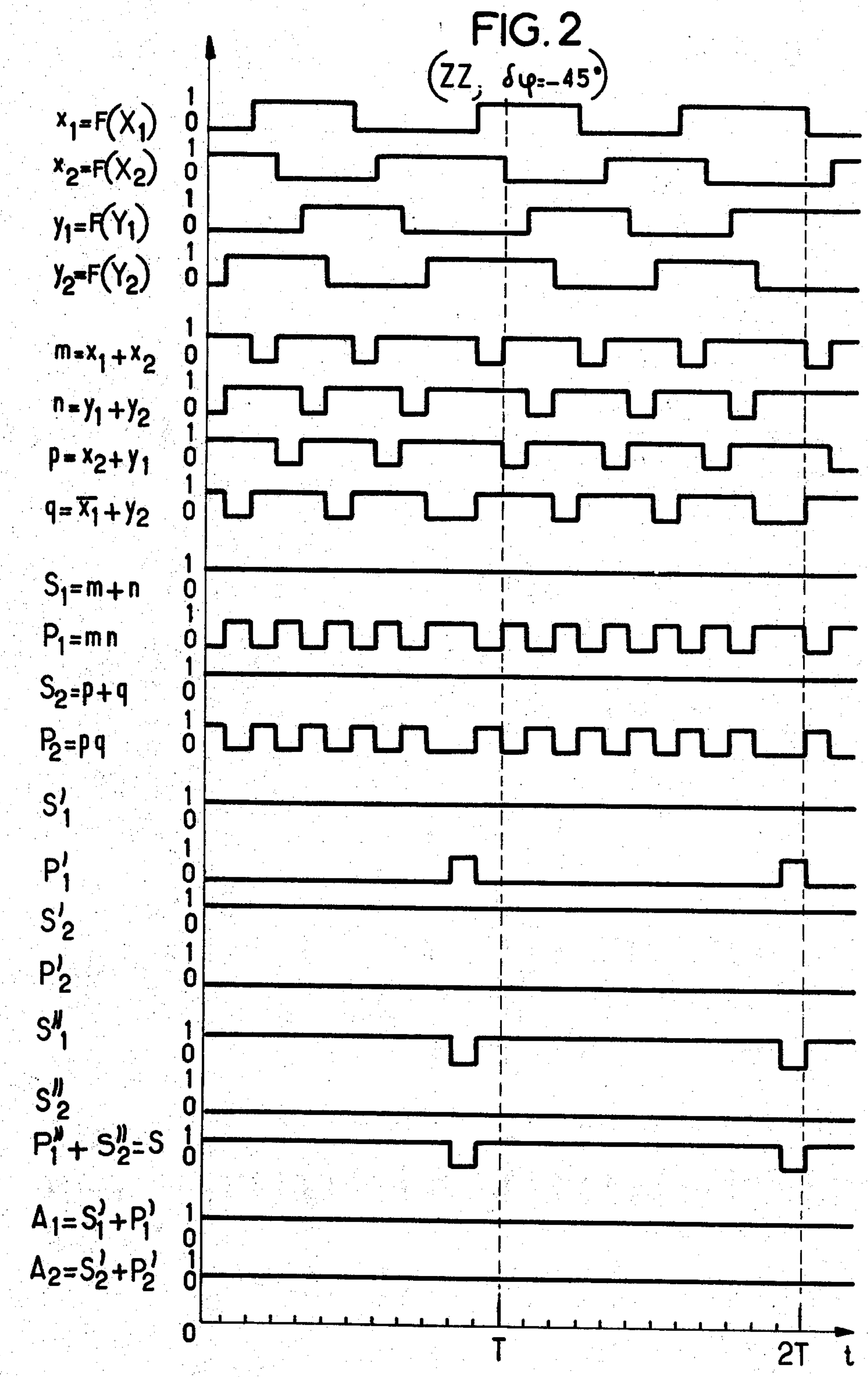
FIG. 2 is a diagram representating as a function of time the various binary quantities involved in the demodulation process of the invention for successive pairs of signals of the form ZZ.

The demodulation procedure will now be explained in greater detail by means of FIG. 2, in which are shown, as a function of time, the variations of the various above-mentioned binary quantities. FIG. 2 shows this for the case corresponding to the curve at the top of FIG. 1, that is to say, that of a monotonic sequence of signals ZZ, with phase jump $\delta\varphi=-45$ degrees from one time interval T to the next.

On the four top lines of FIG. 2 are shown the binary values of the above quantities denoted by $x_1$, $y_1$, $x_2$, $y_2$ with the convention already mentioned that the binary value 1 corresponds to a negative polarity of the sampled wave (FIG. 1), while the value 0 corresponds to a positive polarity of the said wave.

There are also shown below the four top lines the variations of the quantities $m$, $n$, $p$, $q$, $S_1$, $P_1$, $S_2$, $P_2$, $S'_1$, $P'_1$ $S'_2$ $P'_2$, as well as other quantities $P''_1$ and $S''_2$, the origin and purpose of which will be explained later, and, finally, the values $A_1$ and $A_2$ (derived from $S'_1$, $P'_1$, $S'_2$, $P'_2$) of the demodulated binary signals.

In FIG. 2, the graphical form of representation of the different variations is based on the assumption that when a sampling has been effected, the binary value derived from it is stored until a fresh sampling reveals a different value.

It will thus be found in FIG. 2 that by following the different operations indicated from $x_1$, $y_1$, $x_2$, $y_2$, we constantly have $S_1=S_2=1$. $P_1$ and $P_2$, on the contrary, alternately assume each of the values 0 and 1, the changes in value taking place at time intervals equal to the eighth of the cycle of the carrier wave (that is to say, in the present case $T_0/8=T/12$).

An exception to this rule furthermore occurs in the vicinity of the times 0, T, 2T, etc. where as phase jump of the carrier wave occurs. The periodic variation with the period $T_0/4$ of the values of $P_1$ and $P_2$, owing to the rules of logical addition, do not change those of the quantities $(S_1+P_1)$ and $S_2+P_2)$, which represent finally the two elements $A_1$ and $A_2$ of a pair of demodulated signals. It is, however, desirable for reasons which will be clearer later, to obtain from the quantities $S_1$, $S_2$, $P_1$, $P_2$ other "smoothed" quantities $S'_1$, $S'_2$, $P'_1$, $P'_2$ largely free from such variation.

In fact, the type (ZZ, AZ, AA or ZA) of the pairs of signals capable of being received by a demodulator not being known beforehand and being moreover variable from one moment to another, it is important to protect oneself against the perturbations which may be caused, inside the duration T of the same dibit, by variations produced with the period $T_0/4$ (that is to say, at instants spaced apart by $T_0/8$), and this can only be accomplished by systematically freeing all the signals $S_1$, S, $P_1$ and $P_2$ from such variations.

Such a result is obtained, according to the invention, by an operation called "numerical filterings," applied continuously and permanently to each of the variables $S_1$, $S_2$, $P_1$, $P_2$, which operation comprises at any given instant effecting the logical product of the value of the variable considered by the value which it had at another instant preceding this given instant by $T_0/8$. There are thus obtained the corrected values $S'_1$, $S'_2$, $P'_1$, $P'_2$ shown in FIG. 2, from which the desired values of $A_1$ and $A_2$ are derived by the operations:

$$A_1=S'_1+P'_1$$
$$A_2=S'_2+P'_2$$

As will be seen in FIG. 2, the values of $P'_1$ and $P'_2$ are constant, with the exception of short-duration anomalies produced in the vicinity of the instants T, 2T, etc., where the phase of the wave undergoes an abrupt variation. Moreover, these anomalies do not affect the values $A_1$ and $A_2$, as is shown in FIG. 2.

Figure 3:
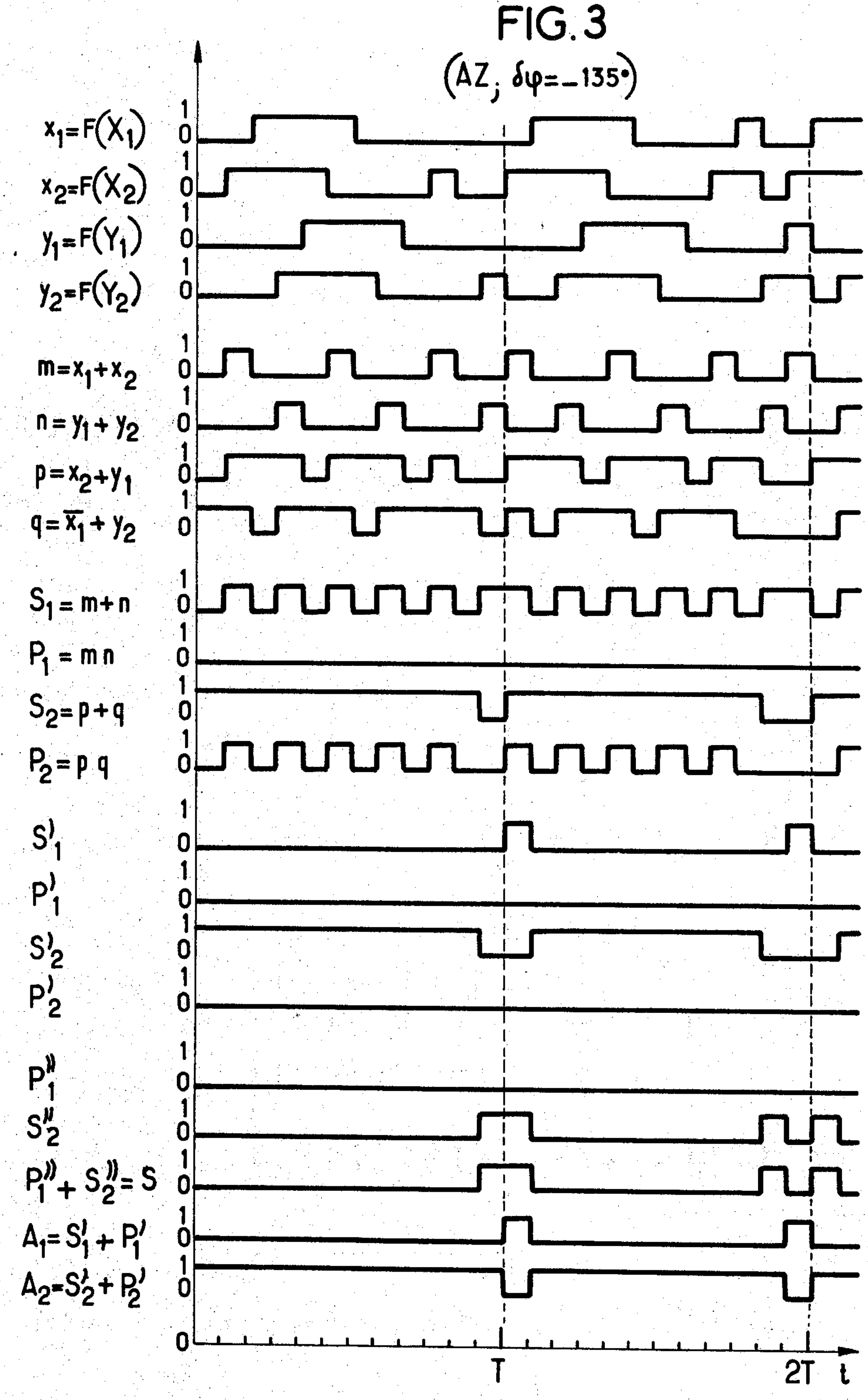
FIGS. 3, 4 and 5 are diagrams similar to that of FIG. 2, but for the cases of the pairs AZ, AA and ZZ, respectively.

FIG. 3 is a graphical representation, similar to that of FIG. 2, but this time constructed for the case of "AZ" dibits, corresponding to a phase jump of (−135) degrees at the instants T, 2T, etc.

As will be seen in FIG. 3, the quantities affected by a periodical variation at instants spaced by $T_0/8$ are now no longer $P_1$ and $P_2$, but $S_1$ and $P_2$. The direct formation of the quantities $(S_1+P_1)$ and $(S_2+P_2)$ leads in particular for the first of these quantities to values varying very rapidly within time intervals such as (0, T) and (T, 2T), values which would not, therefore, be utilizable for the representation of demodulated signals.

The graph of FIG. 2 shows that the rapid and systematic variations in question are, on the contrary, eliminated in $A_1$ and $A_2$, respectively equal to $(S'_1+P'_1)$ and $(S'_2+P'_2)$, which now only show accidental variations of short duration in the vicinity of the times of phase jump such as T and 2T.

Figure 4:
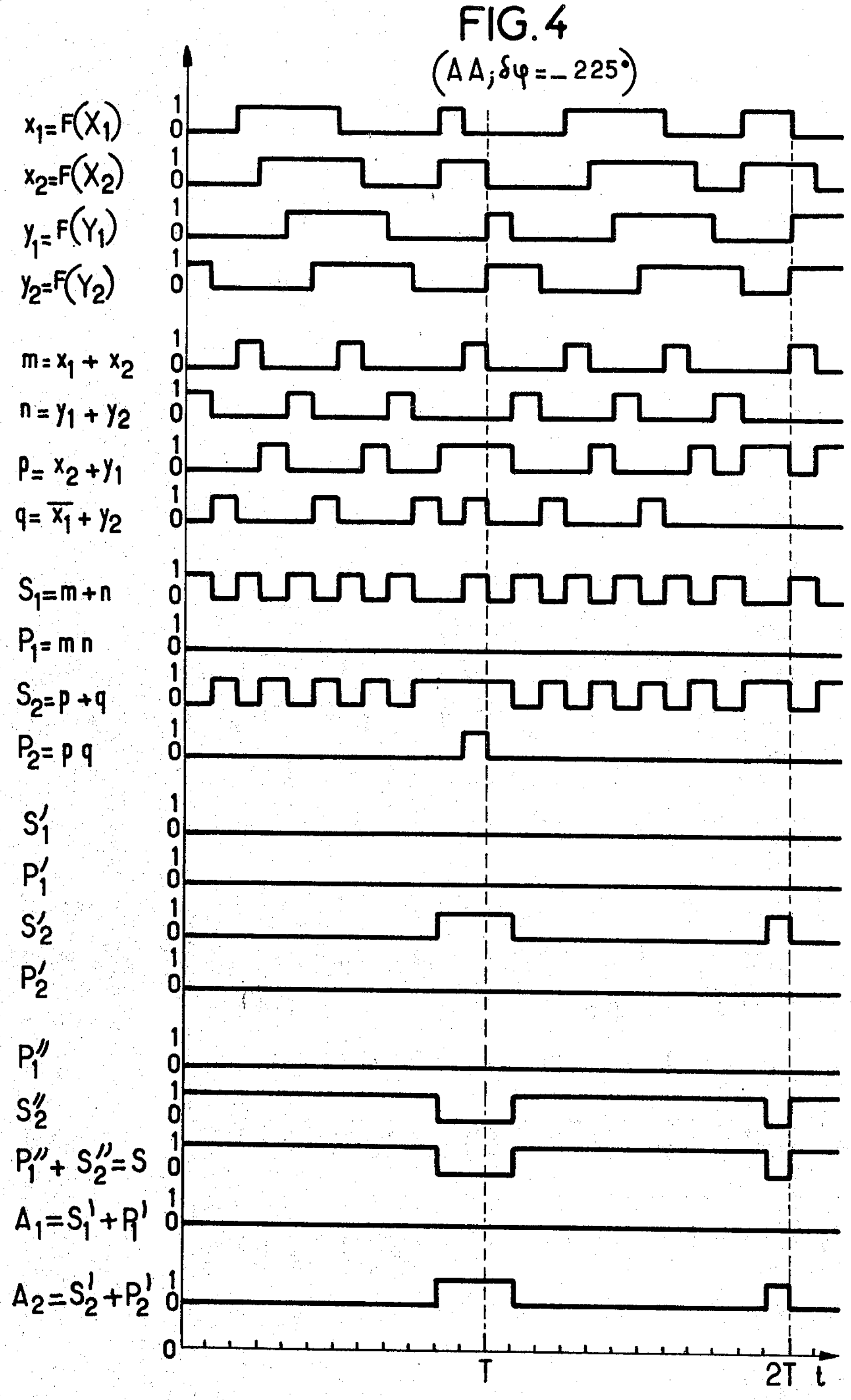
Figure 5:
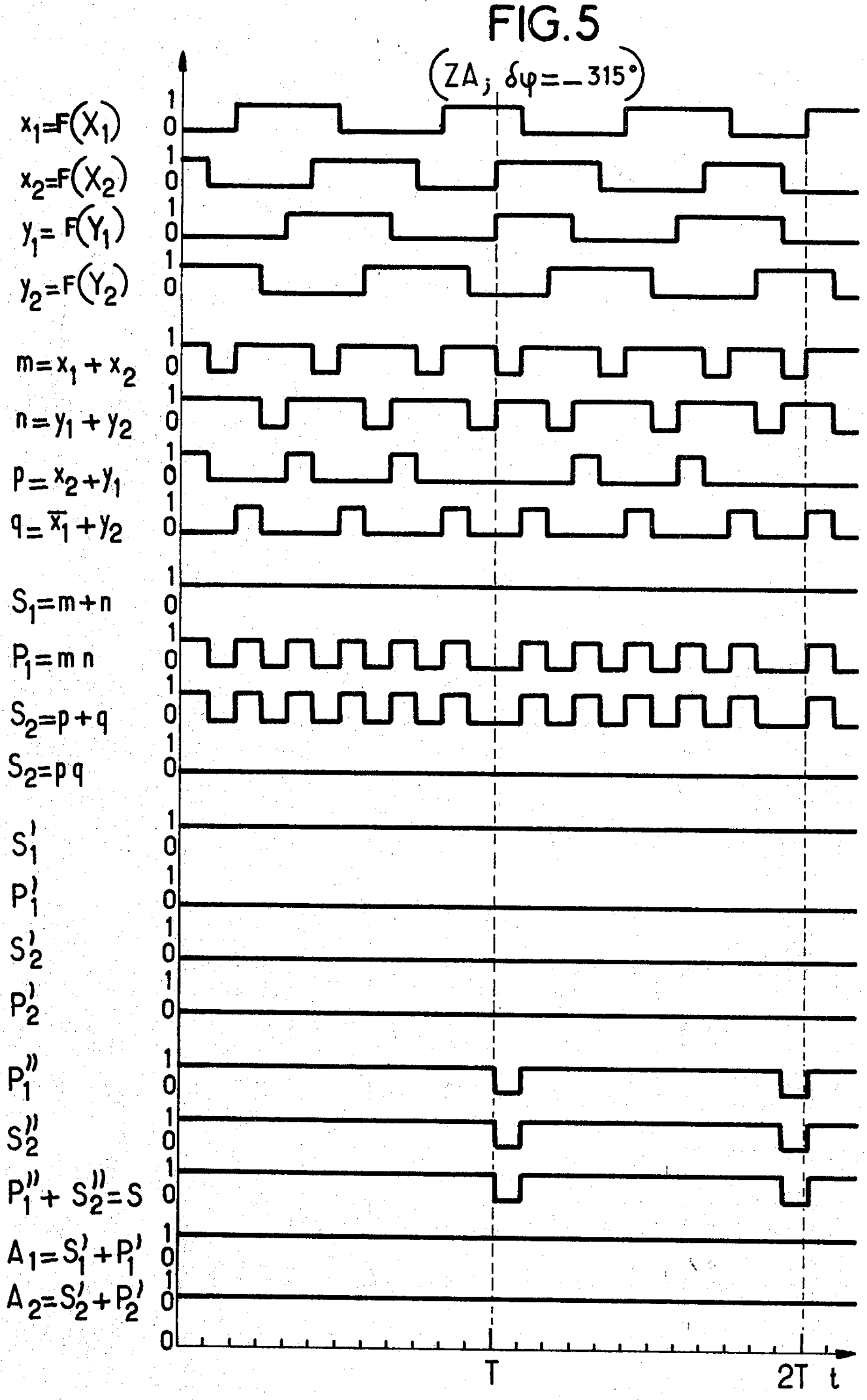

FIGS. 4 and 5 are graphical representations showing similar results for the cases of the dibits AA and ZA.

In FIGS. 2 to 5, there are also to be seen lines on which is represented the behavior as a function of time of quantities denoted by $P''_1$, $S''_2$ and $(P''_1+S''_2)$. The quantities $P''_1$ and $S''_2$ are derived from the quantities $P_1$ and $S_2$ by a process similar to the above-mentioned "numerical filtering" and utilizing, as will be seen later, the same apparatus. According to this latter process, the quantities $S''_2$ and $P''_1$ are obtained by effecting for each of the quantities $S_2$ and $P_1$ the "modulo 2" logical sum of the value of that quantity at a given instant, and its value at an instant preceding said given instant by $T_0/8$. The results, presented graphically in FIGS. 2 to 5, show that the quantity $(P''_1+S''_2)$ remains practically constant with the exception of variations of short duration in the vicinity of the phase-jump instants 0, T, 2T, etc. These variations after differentiation with respect to time and polarity selection, may act as synchronization pulses for the control, by any known means, of a time base defining successive intervals of duration strictly equal to the duration T of the dibits, and the commencement and end times of which preserve a well-defined position in relation to the times corresponding to them in each of these dibits. Such a time base is necessary, for example, when after having obtained the values of the components $A_1$ and $A_2$ of a dibit at two output terminals separated by a demodulator according to the invention, it is desired to proceed to the multiplexing in time of these components on one and the same ultimate transmission channel. The synchronized time base then serves to define the instants of commencement and end of each of the multiplexed signals (which is reduced at the same time in duration by about half), while their binary values are obtained by recurrently sampling with the period T the binary values respectively obtained at one end and the other of the two above-mentioned separated output terminals.

Devices for carrying carrying out the processes and methods explained above will now be described in detail. Before proceeding, however, to the description of the demodulators, it will be recalled first of all how a carrier wave having suitable modulation characteristics may be obtained by means of a simple transmitting device, selected by way of example and not forming a subject of the present invention.

Figure 6:
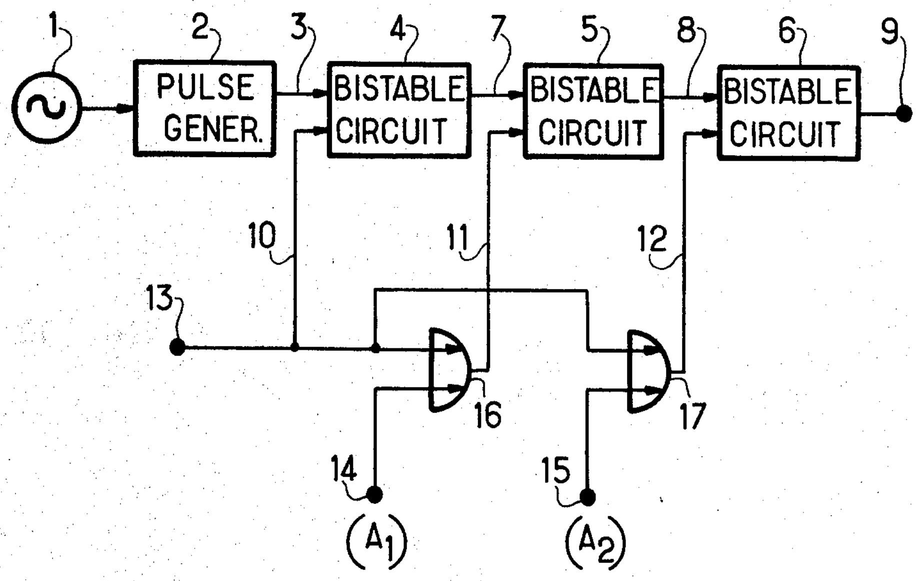
FIG. 6 represents, in a simplified manner, a signal transmitter, not forming part of the invention, but capable of supplying phase-modulated waves adapted to be demodulated by the processes and devices of the invention.

Referring to FIG. 6, there will be seen in the latter a generator 1, supplying for example a frequency $f_0$ equal to that of the desired carrier wave and synchronizing a pulse generator 2 supplying a wave of rectangular form at the frequency $8f_0$. These pulses are applied by a connection 3 to one of the inputs of a bistable circuit 4, forming one of the three stages of a pulse frequency binary divider comprising three bistable circuits 4, 5, 6 connected in cascade by the connections 7 and 8, connecting respectively the outputs 4 and 5 to the first inputs of 5 and 6. The output 9 of the circuit 6 forms the output of the apparatus. If there are applied by one of the connections 10, 11, 12 inhibition pulses to one or more of the second inputs of 4, 5, 6 an abrupt change of phase is produced in the rectangular wave obtained at 9, and the magnitude of this change of phase differs, depending on whether the said inhibition pulses are applied simultaneously to one, two or three of the circuits 4, 5, 6 by the connections 10, 11, 12. In the device of FIG. 6, pulses of short duration of period T are constantly applied by the circuit 4, while they are transmitted to 5 and 6 by the connections 11 and 12 only if one or both of the corresponding "AND" circuits 16 and 17 are made conducting by the presence of control signals at one or both of their control inputs 14 and 15, to which are respectively applied the modulating binary signals $A_1$ and $A_2$. The importance of the phase jump obtained at the output 9 of 6 naturally depends on whether either or both circuits 16 and 17 are rendered conducting by these signals $A_1$ and $A_2$. A simple low-pass filter applied to the wave received at 9 permits a wave modulated by phase jumps to be obtained which may be applied to a transmission line.

Figure 7:
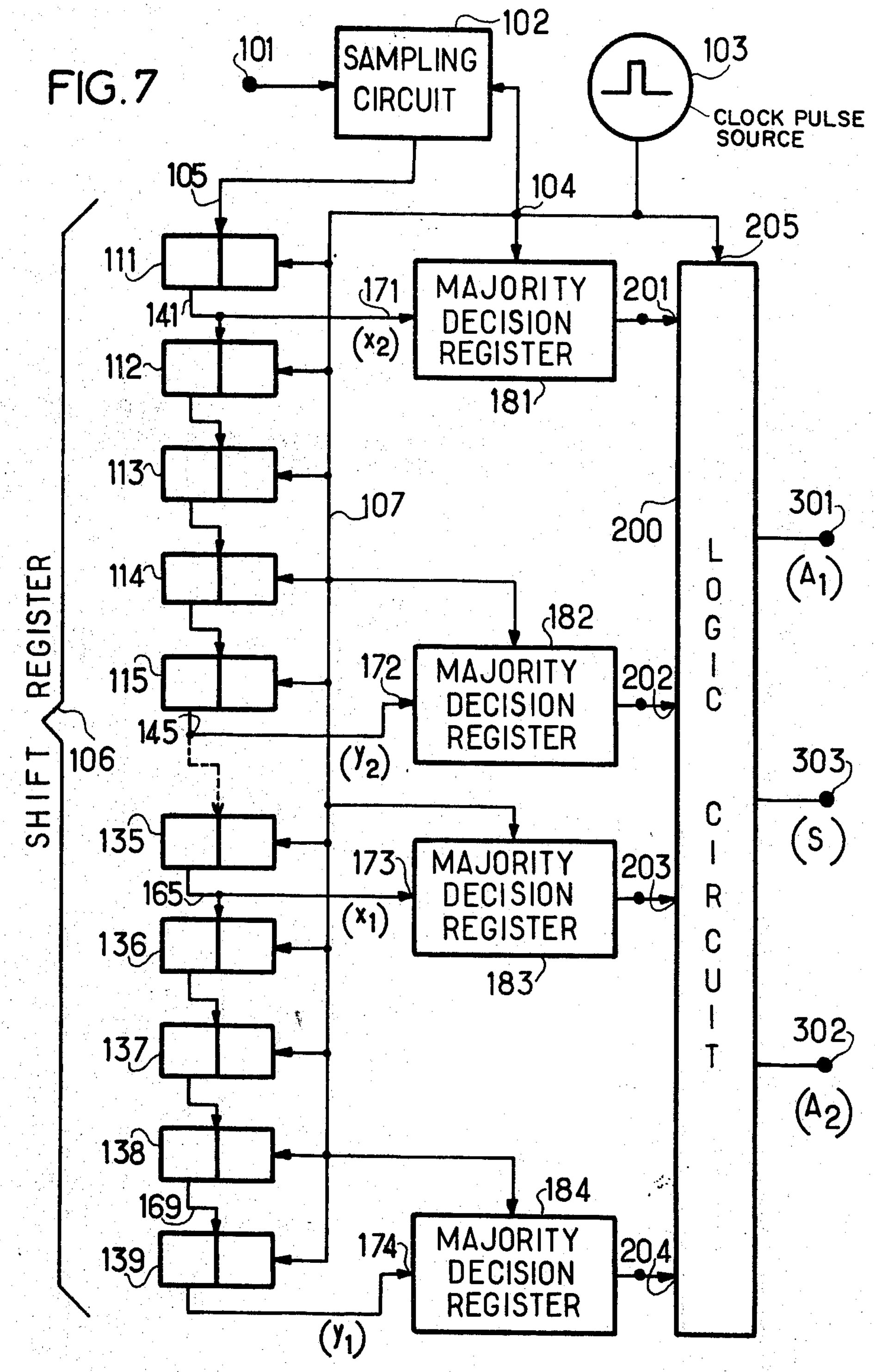
FIG. 7 represent diagrammatically the constitution of a demodulator according to the invention, and FIG. 8 a logical circuit forming part of the demodulator of FIG. 7.

Referring now to FIG. 7, there will be seen in the latter a block circuit diagram of a preferred embodiment of the demodulator of the invention. In FIG. 7, the wave to be demodulated is received at the terminal 101 and is subjected to the action of a sampling circuit 102, the operation of which is regulated by the output 104 of a source of clock pulses 103, supplying control pulses at the frequency $16f_0$, i.e., 24 times during the duration T of each pair of binary signals phase-modulating the carrier wave of frequency $f_0$.

The sampled wave from 102 is received at the input 105 of the first stage 111 of a shift register 106 having 29 stages 111 to 139, of which only the stages 111 to 115 and 135 to 139 are shown in the drawing; each stage comprises a bistable circuit, and the operation of this register is preferably regulated by a shift line 107 fed by the output 104 of the clock 103. Each time a sample is received at 105, it causes the first stage 111 of the register 106 to operate, that is to say, according to the polarity of the sample, this first stage assumes either of its two possible states, thus causing the appearance, at its output 141, of a binary signal $x_2$ equal for example to 1 volt for negative polarity of the sample, and to 0 volt for positive polarity of that sample. The stages 111 to 139 are thus sequentially controlled, and as there are 29 stages and 24 samplings per time interval T, there are in the register, at the respective outputs of the stages 111, 115, 135 and 139, the binary signals corresponding to the samplings effected, for 111 at the last sampling instant $t$, for 115 at the instant $(t-T_0/4)$, for 135 at the instant $(t-T)$, and for 139 at the instant $(t-T-T_0/4)$; and the corresponding binary signals $x_2$, $y_2$, $x_1$, $y_1$ appear at the respective outputs 141, 145, 165 and 169 of the stages 111, 115, 135 and 139.

From the outputs 141, 145, 165, 169 of the register stages 111, 115, 135 and 139, the signals $x_2$, $y_2$, $x_1$, $y_1$ are respectively directed to the four inputs 201 to 204 of the logical circuit 200 which has to process them. The connections between (141, 145, 165, 169) on the one hand, and (201, 202, 203, 204) on the other are ensured by connection means which may be simple direct connections, but which will preferably be formed by majority decision registers 181, 182, 183, 184, having inputs 171 to 174 connected respectively to 141, 145, 165, 169, and outputs connected respectively to the inputs 201 to 204 of 200. The operation of the devices 181 to 184 is regulated by the clock 103, whereof the output 104 is also connected to the control input 205 of the logical circuit 200.

The logical circuit 200 processes the binary signals $x_2$, $y_2$, $x_1$, $y_1$ respectively applied to its input terminals 201, 202, 203, 204 for supplying, on the one hand, at its output terminals 301 and 302 the demodulated binary signals $A_1$ and $A_2$, and on the other hand, at its output terminal 303, the synchronization signals $S=(P''_1+S''_2)$, the nature and purpose of which have already been defined above in connection with the corresponding lines of the graphs of FIGS. 2 to 5.

A detailed description of an embodiment example of the logical circuit 200 will now be given by means of FIG. 8, for the case where the number N of half-cycles of the carrier wave comprised in the duration T of a pair of binary modulating signals ($A_1$, $A_2$) is odd. The changes to be made in the operations to be effected in this circuit and the constitution of the latter, in the case where the number N is even, will likewise be specified.

Figure 8:
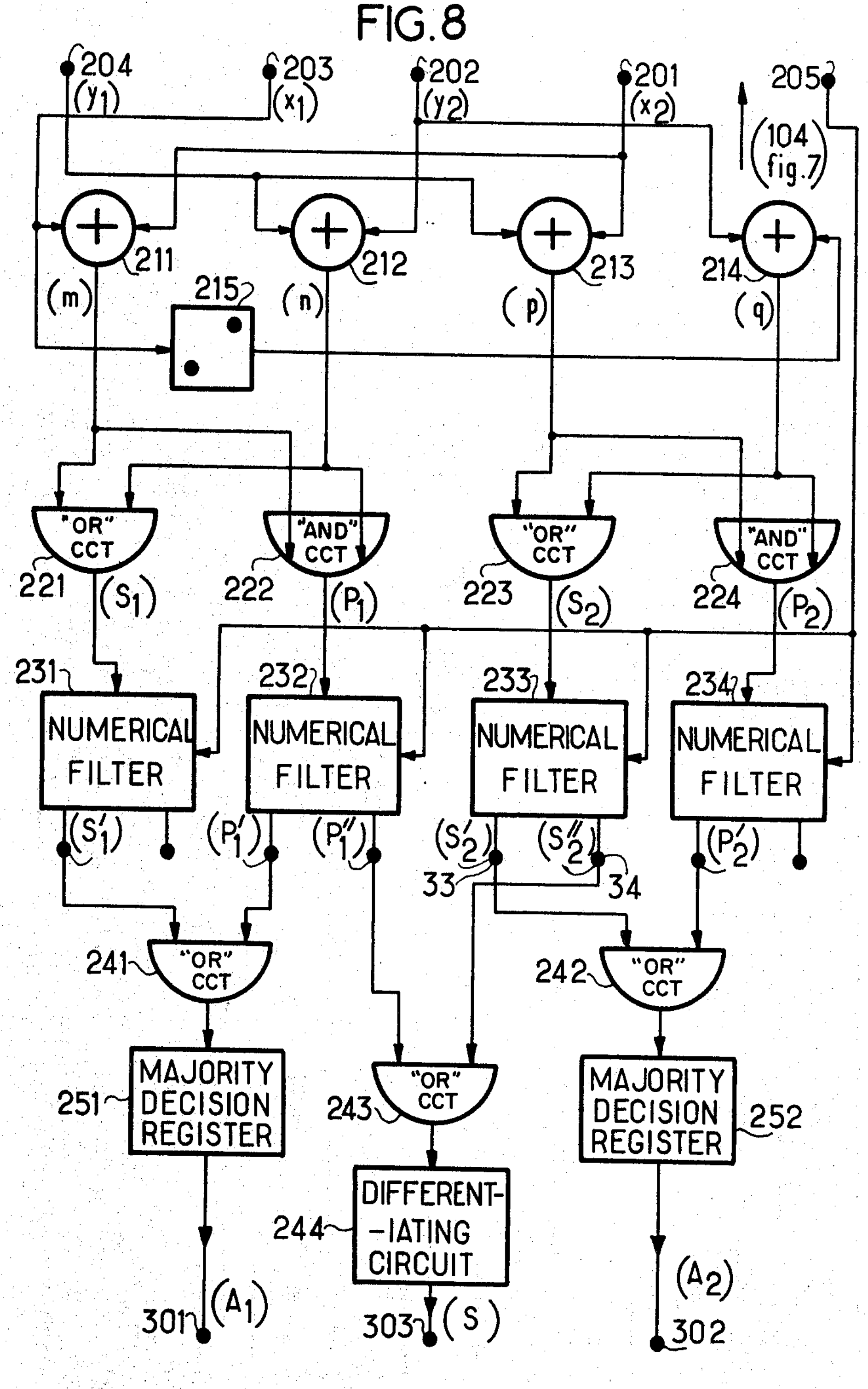

Referring now to FIG. 8, there will be seen in the latter input terminals 201, 202, 203, 204, which are the same as those bearing the same references in FIG. 7, and which receive respectively from the shift register 106 (FIG. 7) the signals $x_2$, $y_2$, $x_1$, $y_1$ by means of the majority decision registers 181, 182, 183, 184 (FIG. 7). By means of half-adders ("modulo 2" logical adders, also called "exclusive OR" circuits) 211, 212, 213, 214 (FIG. 1), conventionally represented here by a circuit surrounding a cross, the following "modulo 2" logical sums are performed:

$$m=x_1\oplus x_2 \quad n=y_1\oplus y_2 \quad p=x_2\oplus y_1 \quad q=\overline{x}_1\oplus y_2$$

It will be observed that the last of these sums involves the quantity $\overline{x}_1$ obtained from the terminal 203 by means of the logical reversing switch 215. (It may be verified that an equivalent result would be obtained by connecting directly to 203 that of the inputs of 214 which, in FIG. 8, is connected to 215, and inserting a reversing switch at the output of 214.)

The quantities $m$, $n$, $p$, $q$ being thus obtained at the respective outputs of the half-adders 211 to 214, fresh logical operations are performed on these quantities by means of "OR" circuits 221 and 223 and "AND" circuits 222 and 224. There are thus obtained the logical sums and products $(m+n)$, $(p+q)$, $mn$ and $pq$, respectively, at the outputs of 221 and 223, on the one hand, and of 222 to 224 on the other hand. These logical sums and products constitute the quantities $S_1$, $S_2$, $P_1$, $P_2$ defined in the foregoing in the course of the explanation of the process of the invention and shown in the graphs of FIGS. 2 to 5, such that $$S_1=m+n \quad S_2=p+q \quad P_1=mn \quad P_2=pq$$

As already explained earlier, it is not generally possible to determine without any ambiguity the demodulated binary signals $A_1$ and $A_2$ from $S_1$, $S_2$, $P_1$ and $P_2$, and these latter quantities must undergo fresh processing. This is the purpose of the selection means 231, 232, 233, 234 which, for convenience of language, will now be called "numerical filters." As already explained in connection with FIGS. 2 to 5, the function of these circuits is to effect the logical product of the value at a given instant of each of the said quantities $S_1$, $S_2$, $P_1$, $P_2$ by the value which it had at an instant preceding this given instant by a time interval equal to one-eighth of the cycle $T_0$ of the carrier wave and thus to obtain the quantities $S'_1$, $S'_2$, $P'_1$, $P'_2$ (shown graphically in FIGS. 2 to 5), from which quantities it is possible to derive $A_1$ and $A_2$.

Figure 9:
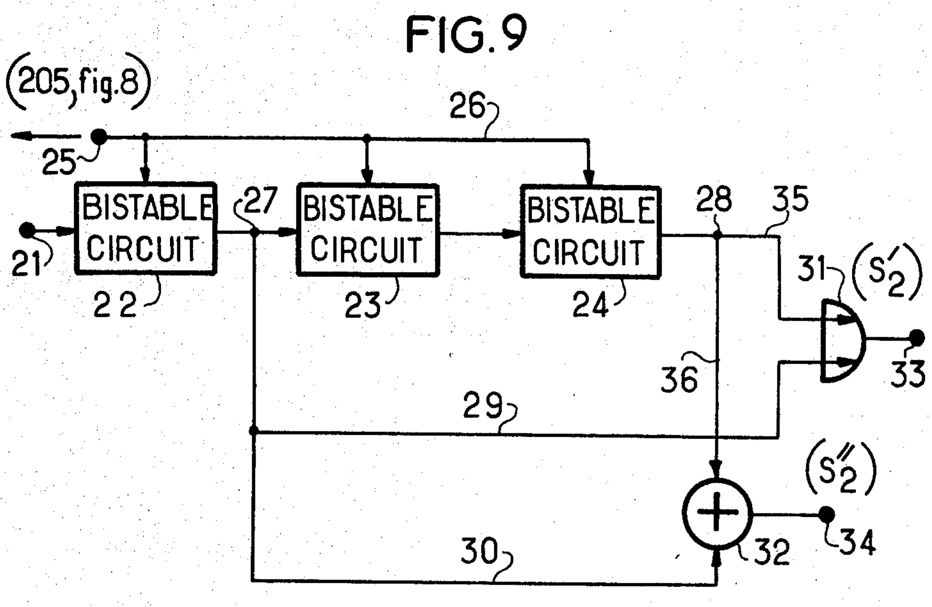
FIG. 9 represents an important element, called "numerical filtering" element of the demodulation device of the invention.

The operation of one of the numerical filters 231 to 234, the filter 233 for example, will now be explained with reference to FIG. 9, showing in detail the said filter 233.

In FIG. 9, a shift register having a small number of stages comprises the circuits 22, 23, 24, which are three bistable circuits connected in cascade, the input 21 of the first of which circuits receives the binary signals (for example, the signals $S_2$ of one of the FIGS. 2 to 5) which is to be processed. A shift line 26 is fed from a terminal 25, connected in turn to the terminal 205 (FIG. 8), fed in turn by the output 104 (FIG. 7) of the source of time pulses 103 (FIG. 7). The pulses thus applied to 22, 23, 24 (FIG. 9) by 26 have the effect of transferring at recurrent instants, at the rhythm of the sampling pulses (that is to say, in the present case, at time interval equal to $T_0/16$) the signals registered in each of the stages 22 or 23 to the next stage 23 or 24. At the respective outputs 27 and 28 of 22 and 24 there thus appear binary signals representing the values of $S_2$ at instants spaced by $T_0/8$. The "AND" circuit 31 and the half-adder 32 supply, on the one hand, to the output 33 of 31 the product of the value of the quantity $S_2$ at an instant $t$ by its value at the instant $(t-T_0/8)$, and on the other hand, to the output 34 the quantity $S''_2$, which is equal to the "modulo 2" logical sum of these two values, by means of appropriate connections ensured by the connections 29, 30, 35 and 36 between the outputs of 22 and 24 and the inputs of these circuits 31 and 32.

Reverting now to FIG. 8, there are obtained respectively at the two outputs of the numerical filter 232 the quantities $P'_1$ and $P''_1$ defined in the foregoing in connection with FIGS. 2 to 5, and similarly at the outputs 33 and 34 of the numerical filter 233, the quantities $S'_2$ and $S''_2$, as explained by means of FIG. 9. At one of the outputs of the filters 231 and 234 (FIG. 8) appear also respectively the quantities $S'_1$ and $P'_2$, the other outputs of 231 and 234 not being used.

Still in the manner explained with reference to FIGS. 2 to 5, it is sufficient to add together on the one hand the quantities $S'_1$ and $P'_1$, and on the other hand the quantities $S'_2$ and $P'_2$ to obtain the demodulated binary signals $A_1$ and $A_2$ at the corresponding output terminals 301 and 302 of the circuit of FIG. 8. In the diagram of FIG. 8, the corresponding logical additions are performed by means of the "OR" circuits 241 and 242, whereof the inputs are connected to the appropriate outputs of 231, 233 and 234, and whereof the outputs may be connected to the terminals 301 and 302 either directly or through the medium of the "majority decision registers" 251 and 252, the operation of which is similar to that of the devices of the same denomination 181 to 184 of FIG. 7.

Finally, there will be seen in FIG. 8 a supplementary "OR" circuit 243, whereof the two inputs are connected respectively to those outputs of 232 and 233 which supply the quantities $P''_1$ and $S'_2$. In effecting the logical sum of these latter quantities, the circuit 243 supplies to the output terminal 303 the synchronizing signals S of recurrence period T, the use of which has already been explained. The connection between the output of 243 and the terminal 303 is preferably provided by a circuit 244 effecting differentiation with respect to time, comprising if necessary a selection circuit for the polarity of the pulses obtained after differentiation. The signals received at the terminal 303 may be subsequently processed as to their wave form by any known appropriate device, with a view to the synchronization of any time base circuit operating with the recurrence period T and necessary for the final utilization of the signals $A_1$ and $A_2$ received at the terminals 301 and 302.

It should be well understood that, without departing from the scope of the invention, the logical circuit of FIG. 8 could be replaced by any other circuit effecting in accordance with the rules of Boolean algebra, an equivalent treatment of the information received at the terminals 201, 202, 203, 204.

On the other hand, the example given above has been related to the case where the duration T separating two consecutive phase jumps of the carrier wave contained an odd number N of half-cycles of this carrier wave. If, on the contrary, the number N was even, it would suffice to replace respectively in the above calculations the quantities $x_1$, $y_1$ and $\overline{x}_1$ by the complementary quantities $\overline{x}_1$, $\overline{y}_1$ and $x_1$, which could be obtained at once by inserting reversing switches on each of the connections connecting in FIG. 7 the devices 183 and 184 to the terminals 203 and 204, or again by inserting such reversing switches at the outputs of some of the half-adders 211 to 214 of FIG. 8. The choice of the most economical and most appropriate means in each case is a practical question within the competence of the skilled person versed in the construction of logical circuits.

What I claim is:

1. A demodulator for a periodic carrier wave of period $T_o$ modulated by phase jumps occurring at recurrent instants spaced by time intervals of constant duration T substantially equal to an integer multiple of the half of said period $T_o$, said phase jumps having substantially one of the values 45, 135, 225 and 315 degrees according to the value of a quadrivalent modulating coded signal; said demodulator comprising a sampling circuit controlled by a source of clock pulses for taking samples of said wave at recurrent instants spaced by time intervals substantially equal to a fraction of one eighth of said period and translating each of said samples into a binary signal having either of two possible values according to the polarity of said each of said samples; said demodulator further comprising first connection means for applying said binary signals to storage means storing them for a time at least equal to $(T+T_o/4)$, said storage means being controlled by said pulse source and having a plurality of stages in cascade connection each having an output; and second connection means respectively connecting the outputs of four different of said stages to four input terminals of a logical circuit having a pair of output terminals at which pairs of binary coded signals representing said quadrivalent coded signal are received; said demodulator being characterized in that said logical circuit comprises:

a plurality of half-adders each having two inputs respectively fed from two of said input terminals through second connection means, said two input terminals forming a different pair for each of said half-adders, each of which has an output;

a plurality of "AND" circuits and a plurality of "OR" circuits each having two inputs and an output and each having its inputs respectively fed from two of said outputs of said half-adders;

two pairs of selection means each having an input and an output, latter said input being fed from the output of a different one of said "AND" and "OR" circuits for each of said selection means, each of the latter including second storage means controlled by said pulse source and having a plurality of stages in cascade connection each provided with an output, the outputs of two of latter said stages respectively feeding two inputs of a further "AND" circuit having an output constituting said output of said selection means at which selected binary signals are received; and two further "OR" circuits each having two inputs respectively fed from the two outputs of a different one of said pairs of selection means, each of said further "OR" circuits having an output connected through third connection means to one corresponding of said output terminals.

2. A demodulator as claimed in claim 1, in which said first storage means consist of a first shift register.

3. A demodulator as claimed in claim 1, in which said second storage means consist of a second shift register.

4. A demodulator as claimed in claim 1, in which said second connection means include a reversing switch.

5. A demodulator as claimed in claim 1, in which two of said selection means include a further output and in which the two of said further outputs are respectively connected to two inputs of a still further "OR" circuit, the output of which is connected to a third output terminal of said demodulator through a time differentiating circuit.

6. A demodulator as claimed in claim 1, in which at least part of said first connection means includes a majority decision register.

7. A demodulator as claimed in claim 1, in which at least part of said third connection means includes a majority decision register.

References Cited

UNITED STATES PATENTS

| | | | |
|---|---|---|---|
| 3,412,206 | 11/1968 | Bizet et al. | 178—88 |
| 3,341,776 | 9/1967 | Doelz et al. | 325—30 |

FOREIGN PATENTS 1,404,512 France.

ROBERT L. GRIFFIN, Primary Examiner

A. J. MAYER, Assistant Examiner

U.S. Cl. X.R.

325—320